US007941938B2

(12) United States Patent
Yu et al.

(10) Patent No.: US 7,941,938 B2
(45) Date of Patent: May 17, 2011

(54) ARTICLE OF FOOTWEAR WITH LIGHTWEIGHT SOLE ASSEMBLY

(75) Inventors: Sui-Chieh Yu, Portland, OR (US); Denis Schiller, Vancouver, WA (US); Daniel DeSpain, Castle Rock, WA (US); David Patrick Jones, Beaverton, OR (US); Eric P. Avar, Aloha, OR (US); Kevin W. Hoffer, Portland, OR (US)

(73) Assignee: Nike, Inc., Beaverton, OR (US)

( * ) Notice: Subject to any disclaimer, the term of this patent is extended or adjusted under 35 U.S.C. 154(b) by 1004 days.

(21) Appl. No.: 11/752,348

(22) Filed: May 23, 2007
(Under 37 CFR 1.47)

(65) Prior Publication Data
US 2008/0244926 A1  Oct. 9, 2008

Related U.S. Application Data

(60) Provisional application No. 60/808,551, filed on May 26, 2006.

(51) Int. Cl.
*A43B 13/00* (2006.01)
(52) U.S. Cl. .......................................... 36/25 R; 36/28
(58) Field of Classification Search ................ 36/28, 31, 36/30 R, 30 A, 25 R
See application file for complete search history.

(56) References Cited

U.S. PATENT DOCUMENTS

| 2,410,019 A | 10/1946 | Davis |
| 4,302,892 A | 12/1981 | Adamik |
| 4,364,188 A | 12/1982 | Turner et al. |
| 4,364,189 A | 12/1982 | Bates |
| 4,398,357 A | 8/1983 | Batra |
| 4,399,620 A * | 8/1983 | Funck ........................... 36/30 R |
| 4,547,979 A | 10/1985 | Harada et al. |
| 4,551,930 A | 11/1985 | Graham et al. |
| 4,557,060 A | 12/1985 | Kawashima |
| 4,642,911 A | 2/1987 | Talarico, II |
| 4,654,983 A | 4/1987 | Graham et al. |
| 4,667,423 A | 5/1987 | Autry et al. |
| 4,730,402 A | 3/1988 | Norton et al. |
| 4,759,136 A | 7/1988 | Stewart et al. |
| 4,766,679 A | 8/1988 | Bender |
| 4,876,053 A | 10/1989 | Norton et al. |

(Continued)

FOREIGN PATENT DOCUMENTS

GB        2007081        5/1979

(Continued)

OTHER PUBLICATIONS

PCT/US2007/012295, Annex to Partial International Search, dated Nov. 5, 2007.

*Primary Examiner* — Marie Patterson
(74) *Attorney, Agent, or Firm* — Banner & Witcoff, Ltd.

(57) ABSTRACT

An article of footwear includes an upper and a sole assembly secured to the upper. The sole assembly includes a first portion having a lower ground engaging surface, an upper surface, and a recess formed in the upper surface. The upper surface of the first portion is in contact with the upper. A second portion is seated in the recess in the first portion and has an upper surface, with the upper surface of the second portion being in contact with the upper. The second portion comprises a foam material having a density less than 0.25 $g/cm^3$.

34 Claims, 4 Drawing Sheets

U.S. PATENT DOCUMENTS

| | | | |
|---|---|---|---|
| 5,025,573 A | 6/1991 | Giese et al. | |
| 5,141,578 A | 8/1992 | Yang | |
| 5,191,024 A * | 3/1993 | Shibata et al. | 525/314 |
| 5,308,420 A | 5/1994 | Yang | |
| 5,318,645 A | 6/1994 | Yang | |
| 5,325,611 A | 7/1994 | Dyer et al. | |
| 5,346,964 A * | 9/1994 | Shibata et al. | 525/314 |
| 5,362,435 A | 11/1994 | Volpe | |
| 5,396,675 A | 3/1995 | Vincent et al. | |
| 5,435,077 A | 7/1995 | Pyle | |
| 5,435,078 A | 7/1995 | Pyle | |
| 5,572,805 A | 11/1996 | Giese et al. | |
| 5,575,089 A | 11/1996 | Giese et al. | |
| 5,787,610 A | 8/1998 | Brooks | |
| RE35,905 E | 9/1998 | Vincent et al. | |
| 5,890,248 A * | 4/1999 | Gee | 12/146 B |
| 5,918,385 A * | 7/1999 | Sessa | 36/59 C |
| 5,921,004 A | 7/1999 | Lyden | |
| 6,061,929 A | 5/2000 | Ritter | |
| 6,082,024 A * | 7/2000 | Del Biondi | 36/28 |
| 6,372,809 B1 * | 4/2002 | Asai et al. | 521/93 |
| 6,892,478 B1 | 5/2005 | Erickson et al. | |
| 2004/0067380 A1 * | 4/2004 | Maeda et al. | 428/500 |
| 2007/0033833 A1 | 2/2007 | Chang et al. | |
| 2008/0244926 A1 * | 10/2008 | Yu et al. | 36/28 |

FOREIGN PATENT DOCUMENTS

JP        2002-34601        2/2002

\* cited by examiner

ARTICLE OF FOOTWEAR WITH LIGHTWEIGHT SOLE ASSEMBLY

This application claims priority to provisional application Ser. No. 60/808,551, filed May 26, 2006, which application is incorporated by reference in its entirety.

BACKGROUND

A conventional article of athletic footwear includes two primary elements, an upper and a sole structure. The upper provides a covering for the foot that securely receives and positions the foot with respect to the sole structure. In addition, the upper may have a configuration that protects the foot and provides ventilation, thereby cooling the foot and removing perspiration. The sole structure is secured to a lower portion of the upper and is generally positioned between the foot and the ground. In addition to attenuating ground reaction forces (i.e., imparting cushioning), the sole structure may provide traction and control foot motions, such as pronation. Accordingly, the upper and the sole structure operate cooperatively to provide a comfortable structure that is suited for a variety of ambulatory activities, such as walking and running.

The sole structure of athletic footwear generally exhibits a layered configuration that may include a comfort-enhancing insole, a resilient midsole formed from a polymer foam material, and a ground-contacting outsole that provides both abrasion-resistance and traction. The midsole is the primary sole structure element that imparts cushioning and controls foot motions. Suitable polymer foam materials for the midsole include ethylvinylacetate or polyurethane, which compress resiliently under an applied load to attenuate ground reaction forces created by the impacts of running and jumping.

Conventional polymer foam materials are resiliently compressible, in part, due to the inclusion of a plurality of open or closed cells that define an inner volume substantially displaced by gas. The polymer foam materials of the midsole may also absorb energy when compressed during ambulatory activities. The compression of the foam is affected by hysteresis loss, and deflection of such systems is affected by the volume of the compressed mass of the midsole.

There are several types of materials used to prepare midsoles. These include ethylene vinyl acetate (EVA), materials containing EVA, for example Phylon and Phylite, polyurethane and materials containing polyurethane.

Ethylene vinyl acetate (EVA) is soft, light, and flexible. It is the least expensive midsole material and is often used in entry-level shoes. Midsoles are cut and shaped from flat sheets of EVA foam. EVA will compress and become flat over time as the air trapped within the foam is squeezed out. Once EVA is compacted, it does not return to its original shape and no longer provides cushioning. EVA compresses faster than other midsole materials.

Phylon is made of EVA foam pellets, slabs, or sheets that are compressed, heat expanded, and then cooled in a mold. Compression-molded Phylon midsoles can be sculpted into a variety of designs that can be identified by their fine wrinkles. Phylon is very lightweight, low-profile, and responsive.

Phylite is an injection-molded unit made of a combination of 60% Phylon and 40% rubber. Phylite is lighter than rubber, but heavier than Phylon and functions as both midsole and outsole. By eliminating a separate midsole and outsole the weight of the shoe is greatly reduced and flexibility is increased.

Polyurethane is a dense, durable, and stable midsole material. Typically, polyurethane is poured into a mold to create a firm midsole that provides maximum protection from impact. Polyurethane is identified by its smooth rubbery feel and tendency to turn yellow with age. Polyurethane is the heaviest midsole material, but it is also the most durable It would be desirable to provide a footwear cushioning system that reduces or overcomes some or all of the difficulties inherent in prior known devices. Particular objects and advantages will be apparent to those skilled in the art, that is, those who are knowledgeable or experienced in this field of technology, in view of the following disclosure of the invention and detailed description of certain embodiments.

SUMMARY

The principles of the invention may be used to advantage to provide an article of footwear having a lightweight sole assembly. This lightweight sole assembly provides footwear that is significantly lighter than other footwear, providing advantages to athletes in running and basketball, for example.

In accordance with a first aspect, a foam material is prepared from a reaction product of about 10 to about 100 phr hydrogenated or non-hydrogenated acrylonitrile butadiene copolymer, 0 to about 40 phr modified hydrogenated acrylonitrile butadiene copolymer, and 0 to about 90 phr alpha olefin copolymer.

In accordance with another aspect, a foam material is used to prepare an article of footwear. The article of footwear has an upper; and a sole assembly secured to the upper, and at least a portion of the sole assembly is prepared from the foam material.

In accordance with another aspect, a foam material has a density less than 0.25 g/cc$^3$ and a resiliency greater than 40.

Substantial advantage is achieved by providing an article of footwear with a lightweight sole assembly. In particular, certain embodiments allow an article of footwear to be highly responsive while reducing the weight of the footwear, thereby improving performance and comfort.

These and additional features and advantages disclosed here will be further understood from the following detailed disclosure of certain embodiments.

Figure 1:
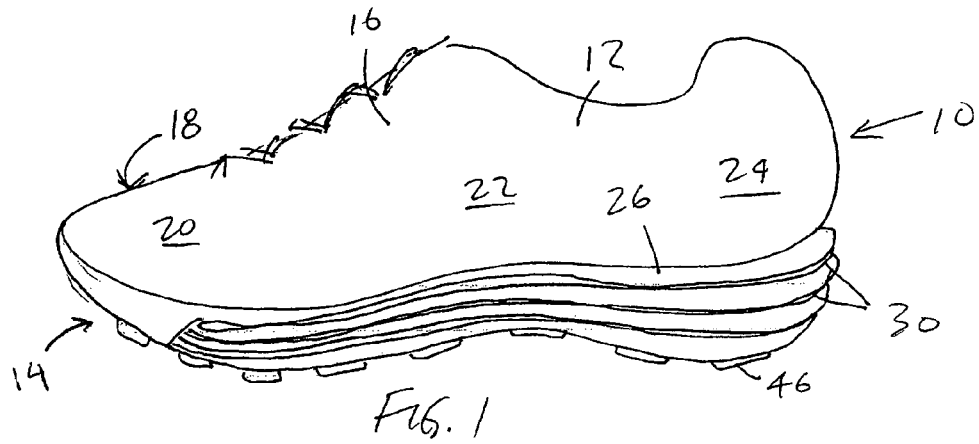
FIG. 1 is an elevation view of an article of footwear with a lightweight sole assembly in accordance with an aspect of the invention.

The figures referred to above are not drawn necessarily to scale and should be understood to provide a representation of the invention, illustrative of the principles involved. Some features of the article of footwear depicted in the drawings have been enlarged or distorted relative to others to facilitate explanation and understanding. The same reference numbers are used in the drawings for similar or identical components and features shown in various alternative embodiments. Articles of footwear as disclosed herein would have configurations and components determined, in part, by the intended application and environment in which they are used.

DETAILED DESCRIPTION (Footwear Description)

Aspects of the invention utilize hydrogenated foams for lightweight material. Further aspects relate to a foamed material with a spongy feel (like walking on the Moon or marshmallows). Further aspects of the invention are directed to light weight, high bouncing feel lunar shoes.

The present invention may be embodied in various forms.

The footwear may be any suitable footwear such as running shoes or basketball shoes where light weight, high bouncing, properties are desired. Running shoes, for example, can be made that are less than half the weight of other conventional running shoes.

One embodiment of an article of footwear 10 is shown in FIG. 1. Footwear 10 includes an upper 12 and a sole assembly 14 secured to upper 12. Sole assembly 14 may be secured to upper 12 by adhesive or any other suitable means. Footwear 10 has a medial, or inner, side 16 and a lateral, or outer, side 18.

Sole assembly 14, which is generally disposed between the foot of the wearer and the ground, provides attenuation of ground reaction forces (i.e., imparting cushioning), traction, and may control foot motions, such as pronation. As with conventional articles of footwear, sole assembly 14 may include an insole (not shown) located within upper 12.

For purposes of general reference, footwear 10 may be divided into three general portions: a forefoot portion 20, a midfoot portion 22, and a heel portion 24. Portions 20, 22, and 24 are not intended to demarcate precise areas of footwear 10. Rather, portions 20, 22, and 24 are intended to represent general areas of footwear 10 that provide a frame of reference during the following discussion.

Unless otherwise stated, or otherwise clear from the context below, directional terms used herein, such as rearwardly, forwardly, top, bottom, inwardly, downwardly, upwardly, etc., refer to directions relative to footwear 10 itself. Footwear is shown in FIG. 1 to be disposed substantially horizontally, as it would be positioned on a horizontal surface when worn by a wearer. However, it is to be appreciated that footwear 10 need not be limited to such an orientation. Thus, in the illustrated embodiment of FIG. 1, rearwardly is toward heel portion 24, that is, to the right as seen in FIG. 1. Naturally, forwardly is toward forefoot portion 20, that is, to the left as seen in FIG. 1, and downwardly is toward the bottom of the page as seen in FIG. 1. Top refers to elements toward the top of the page as seen in FIG. 1, while bottom refers to elements toward the bottom of the page as seen in FIG. 1. Inwardly is toward the center of footwear 10, and outwardly is toward the outer peripheral edge of footwear 10.

Figure 2:
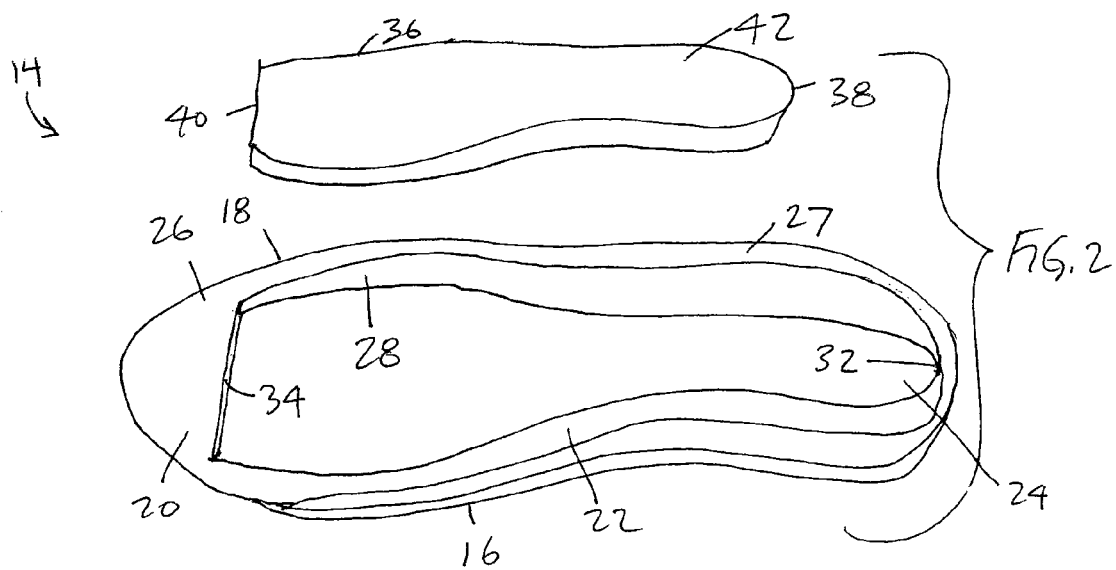
FIG. 2 is an exploded view of the sole assembly of the article of footwear of FIG. 1.

As can be seen in FIG. 2, sole assembly 14 consists of a first portion 26 having an upper surface 27 with a recess 28 formed therein. Upper surface 27 is secured to upper 12 with adhesive or other suitable fastening means. A plurality of substantially horizontal ribs 30 is formed on the exterior of first portion 26. In certain embodiments, ribs 30 extend from a central portion of forefoot portion 20 on medial side 16 rearwardly along first portion 26, around heel portion 24 and forwardly on lateral side 18 of first portion 26 to a central portion of forefoot portion 20.

First portion 26 provides the external traction surface of sole assembly 14. In certain embodiments it is to be appreciated that a separate outsole component could be secured to the lower surface of first portion 26.

Recess 28 extends from heel portion 24 to forefoot portion 20. In certain embodiments, the rear surface 32 of recess 28 is curved to substantially follow the contour of the rear of heel portion 24 and the front surface 34 of recess 28 extends transversely across first portion 26.

An insert 36 is received in recess 28. Insert 36 has a curved rear surface 38 to mate with curved rear surface 32 of recess 28 and a transverse front surface 40 to mate with transverse front surface 34 of recess 28. An upper surface 42 of insert 36 is in contact with and secured to upper 12 with adhesive or other suitable fastening means.

Figure 3:
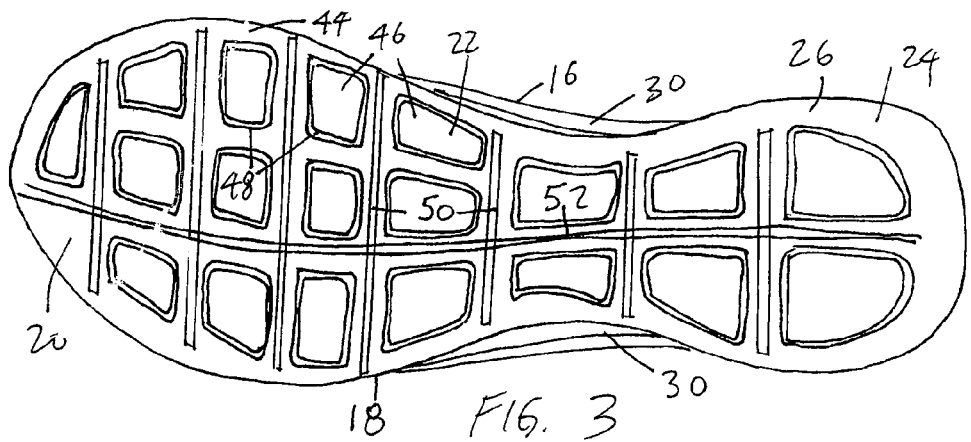
FIG. 3 is a plan view of the bottom of the sole assembly of FIG. 1.

As seen best in FIG. 3, a ground engaging lower surface 44 of first portion 26 includes a plurality of projections 46. Each projection 46 is surrounded by a groove 48. A plurality of transverse slots 50 are formed in lower surface 44, extending between adjacent projections 46. A longitudinal slot 52 extends along lower surface 44 from heel portion 26 to forefoot portion 20.

Insert 36 is formed of a very lightweight yet resilient material. First portion 26 provides structure and support for insert 36. In certain embodiments, insert 36 is formed of a foam material.

Figure 4:
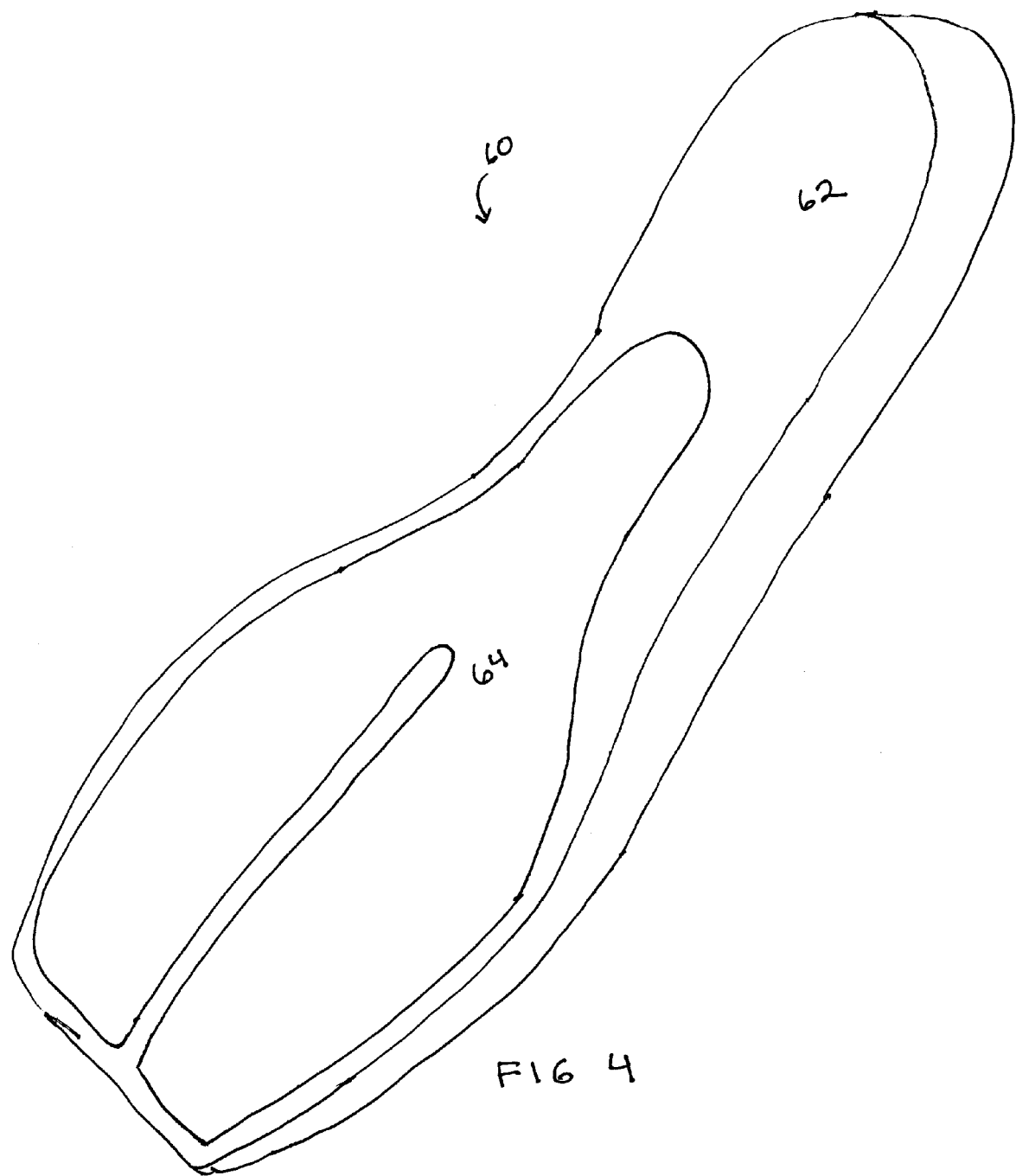
FIG. 4 is a bottom view of an insert of the sole assembly of FIG. 2
Figure 5:
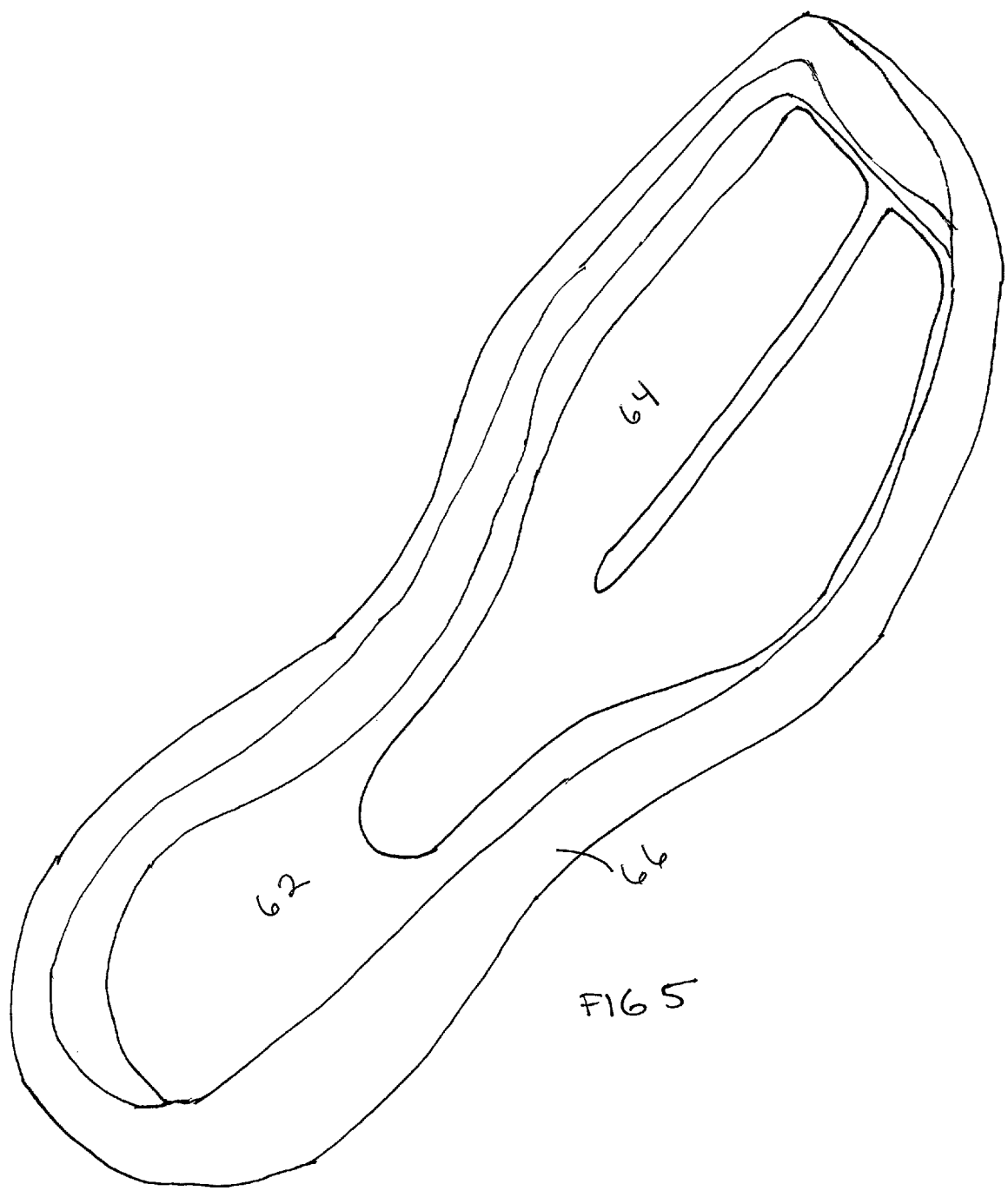
FIG. 5 is a top view of the sole assembly of FIG. 2.
Figure 6A:
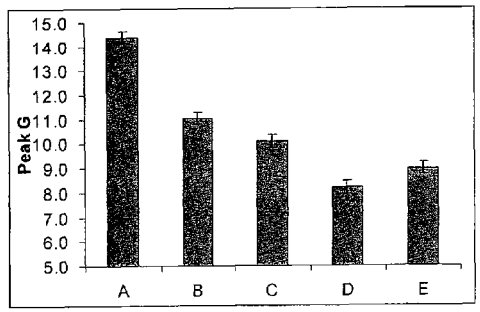
FIGS. 6a-6f are comparative results from tests of sole assembly of Example 4.
Figure 6B:
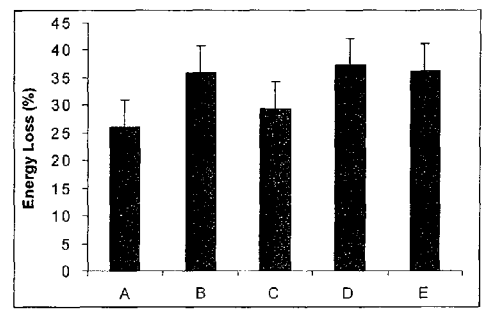
Figure 6C:
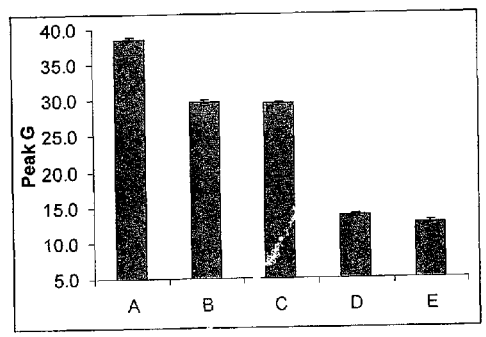
Figure 6D:
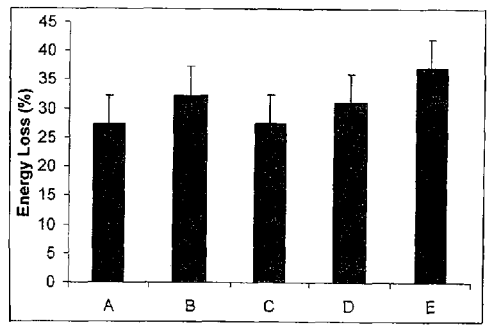
Figure 6E:
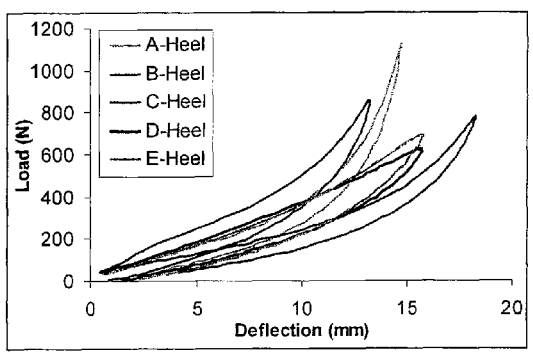
Figure 6F:
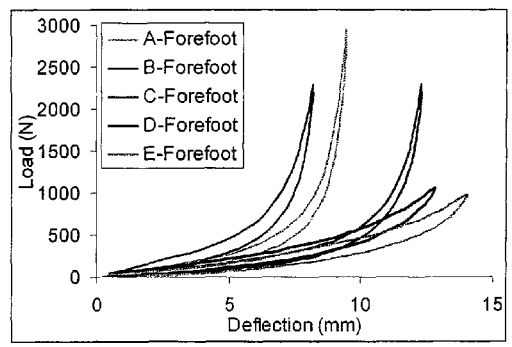
Figure 1:
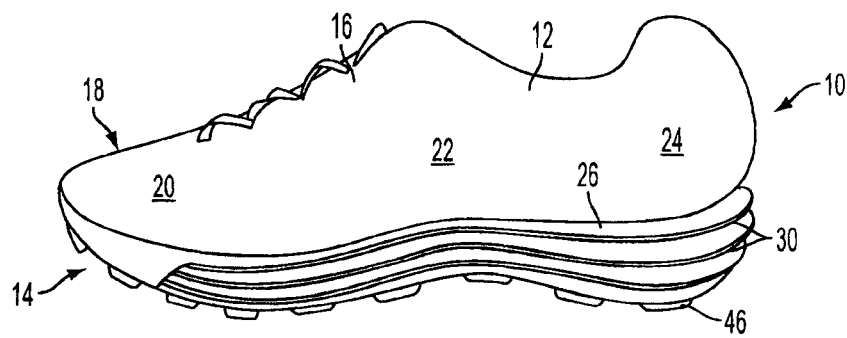
Figure 2:
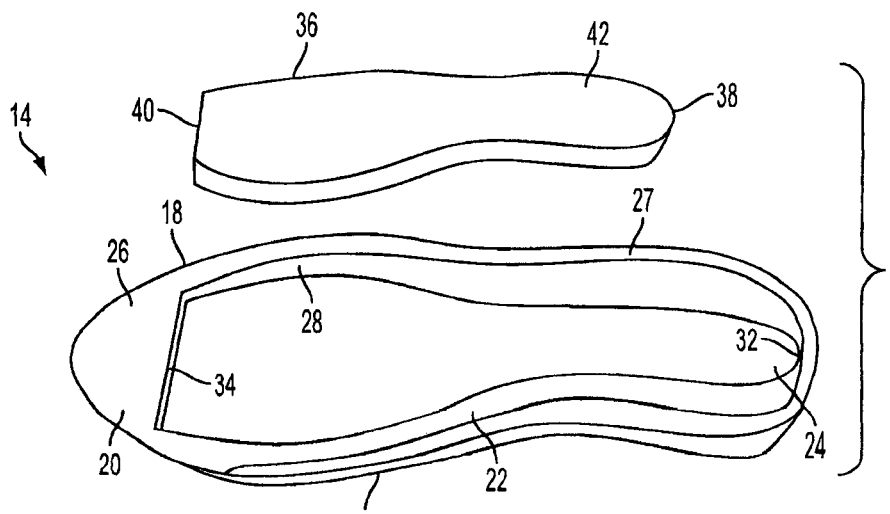
Figure 3:
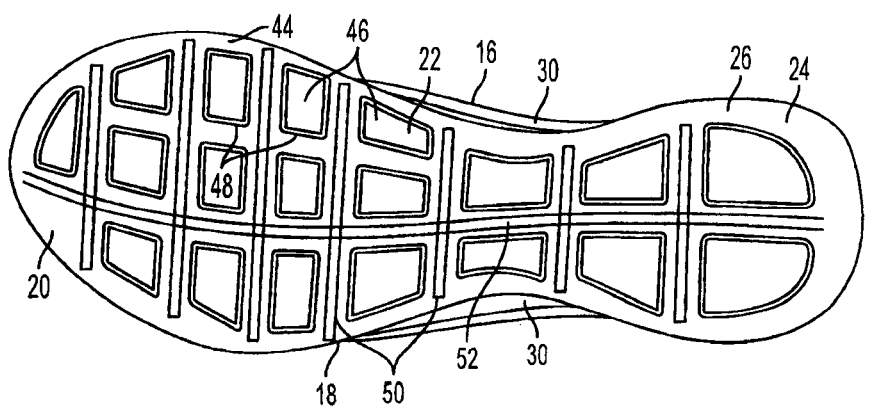
Figure 4:
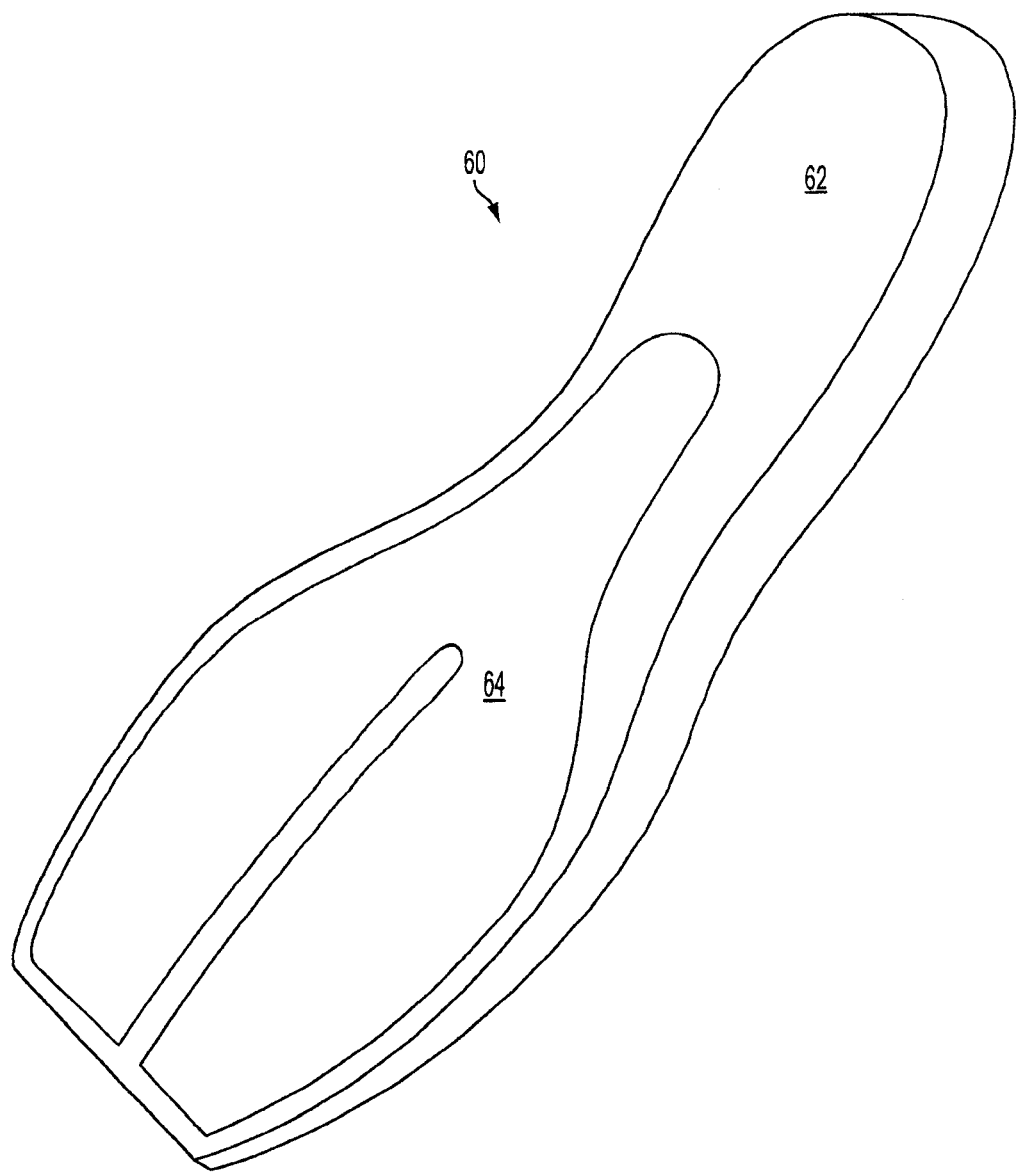
Figure 5:
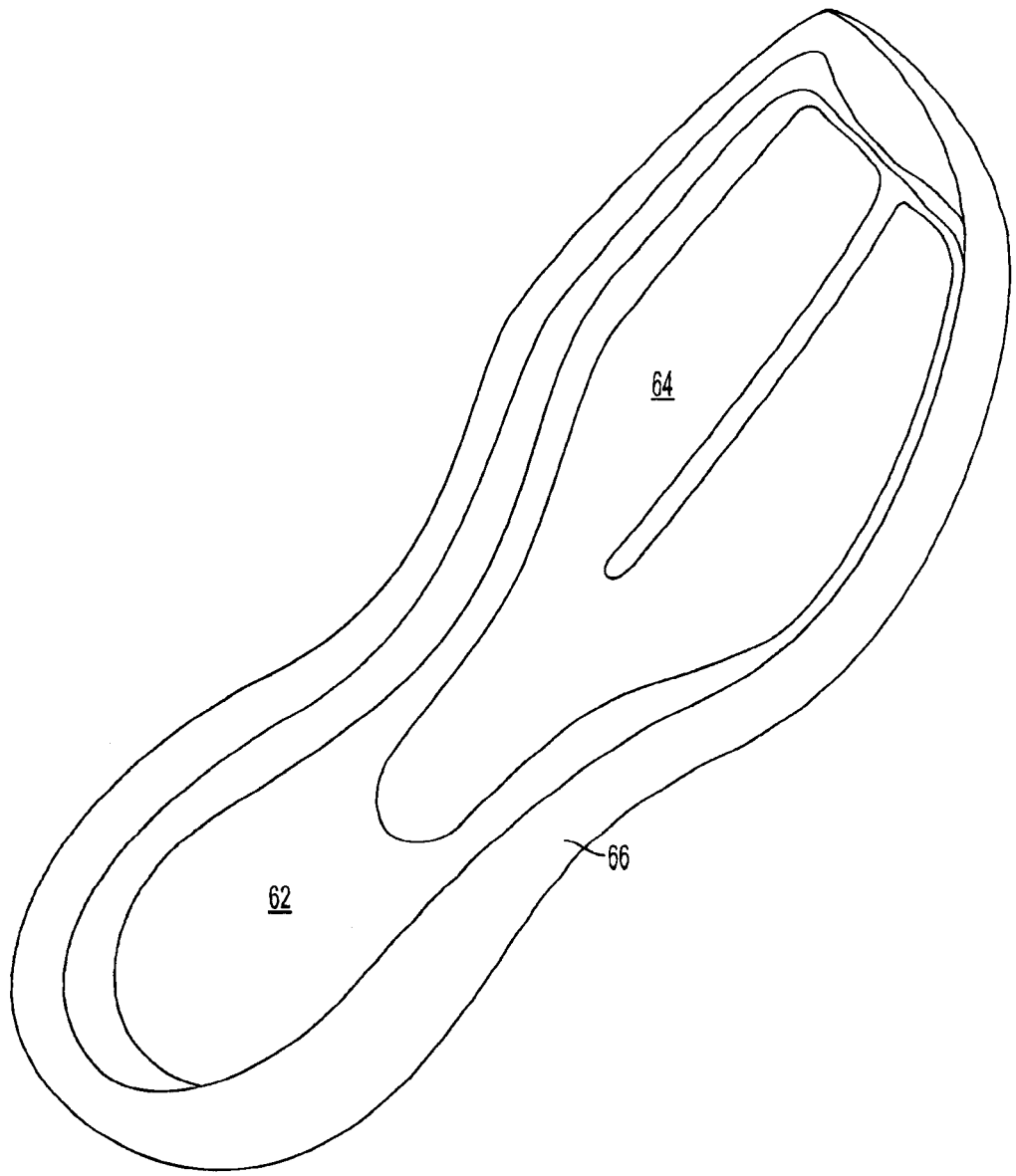
Figure 6A:
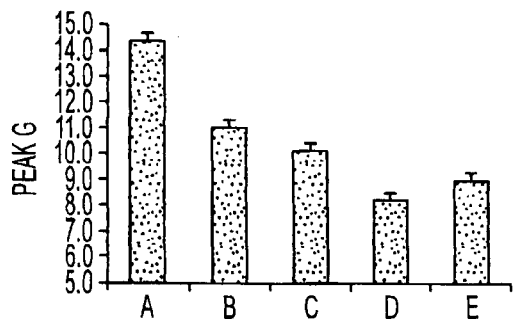
Figure 6B:
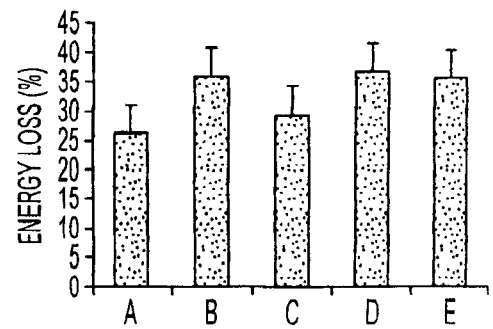
Figure 6C:
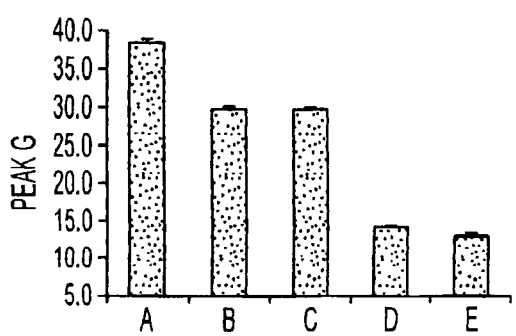
Figure 6D:
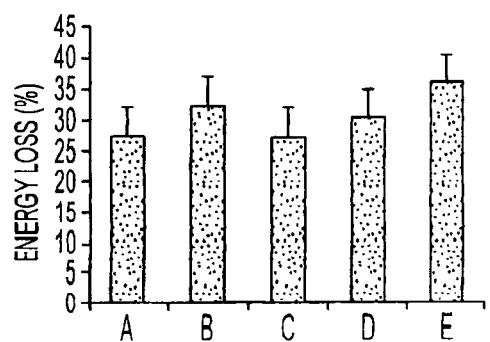
Figure 6E:
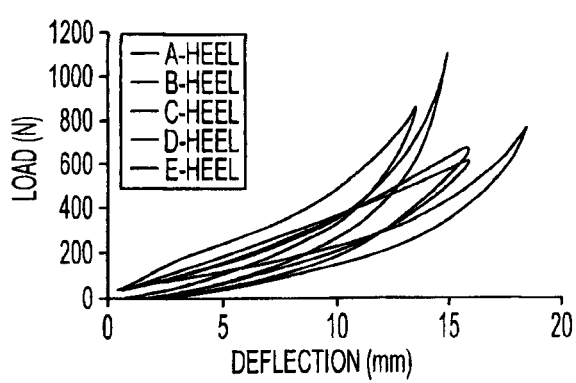
Figure 6F:
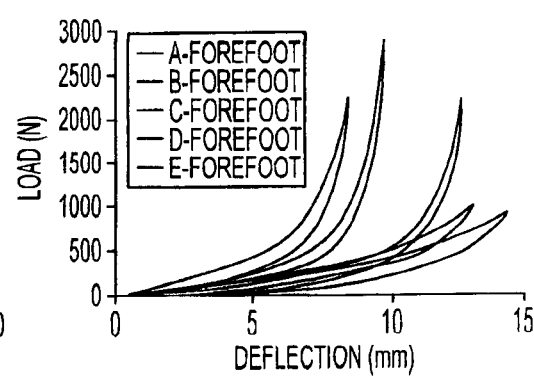

Another embodiment utilizes an insert 60 similar to insert 36 but wherein the insert comprises two types of foam material. A higher density foam supports the heel region and a lower density foam supports the toe region. For example, as shown in FIG. 4 the insert can be made from foam 62 having a density of 0.25 g/cm$^3$ such as Phylon wherein a portion of the foam in the toe region is replaced with foam 64 having a density less than 0.25 g/cm$^3$. Alternatively, the insert may be prepared from a foam having a density less than 0.25 g/cm$^3$ and the heel region could be replaced with higher density foam. The shape of the foam portions of the insert may be any suitable shape. For example, the heel region may be in the form of a wedge to provide additional support for those athletes that tend to over pronate on the medial side of the footwear. This type of duel density insert may be particularly useful in a basketball style shoe. FIG. 5 shows insert 60 containing two types of material 62 and 64, placed in portion 66.

(Introduction to Foam Material)

The foam material used in embodiments described herein has a density of less than 0.25 g/cc$^2$. This, combined with other properties such as a resilience of greater than 40, provides a foam material useful in applications requiring lightweight foam such as a midsole of footwear.

The foam material is prepared from a mixture of hydrogenated or non-hydrogenated acrylonitrile-butadiene copolymer; modified hydrogenated acrylonitrile-butadiene copolymer; and alpha olefin copolymer. Non-hydrogenated (standard) acrylonitrile-butadiene copolymer provides lower cost foam than hydrogenated acrylonitrile-butadiene copolymer. The non-hydrogenated acrylonitrile-butadiene copolymer generally has a higher shrinkage than hydrogenated acrylonitrile-butadiene copolymer.

After mixing and addition of other optional additives, the mixture is ultimately foamed for use as a foamed material. For example, the foam material is used as an inner midsole core having a density less than about 0.25 g/cm$^3$. This core is surrounded by a more rigid outer shell prepared from, for example but not limited to, EVA, Phylon, and polyurethane. Moreover, at higher densities (e.g. about 0.30 g/cm$^3$), the foam material can be used as the entire midsole component or as a midsole/outsole combination component.

The foam material provides the footwear user(s) a perception of soft comfortable cushioning and energy return. This perceived feeling of cushioning and energy return can be quantified using its physical properties, namely high resilience, hardness (e.g. from 20 to 30 Asker C up to 50 Asker C for certain shoes such as basketball shoes) and low energy loss. This foam is not limited to footwear applications, but can also be used in all sport related equipment where the above mentioned improved properties are required.

(Foam Material)

The foam material is prepared from a mixture of hydrogenated or non-hydrogenated acrylonitrile-butadiene copolymer; modified hydrogenated acrylonitrile-butadiene copolymer; and alpha olefin copolymer.

Examples of hydrogenated acrylonitrile-butadiene copolymers include Zetpol 2000. Other grades of hydrogenated acrylonitrile-butadiene copolymer can be used with different percentages of polymer saturation. Typically, this copolymer is used in an amount of about 10 to about 100 parts per hundred (phr), such as about 30 to about 90 phr, or about 40 to about 70 phr.

Non-hydrogenated acrylonitrile-butadiene copolymers can be partially or fully substituted by polybutadiene, styrene butadiene, ethylene propylene diene terpolymer, chlorosulfonated polyethylene polymers, thermoplastic elastomers (TPE) can also be used to form the mixture of copolymers.

Modified hydrogenated acrylonitrile-butadiene copolymers are hydrogenated acrylonitrile-butadiene copolymers are modified with modifiers such as zinc oxide and zinc diacrylate. Suitable modified hydrogenated acrylonitrile-butadiene copolymers include ZCS 2095 (Zeon Chemicals). Typically, this copolymer is used in an amount of from 0 to about 40 phr, such as about 5 to about 40 phr, about 10 to about 30 phr, or about 15 to about 20 phr.

The alpha olefin copolymer includes an ethylene and an alpha olefin, for example having up to 20 carbon atoms, such as but not limited to copolymers of ethylene and octene-1, ethylene-methyl acrylate copolymer, and ethylene vinyl acetate copolymer. Examples of copolymers of ethylene and octene-1 include Engage products from Dow Chemical such as Engage 8480. Typically, this copolymer is used in an amount of from 0 to about 90 phr, such as about 10 to about 90 phr, about 10 to about 40 phr, or about 20 to about 40 phr.

(Additives)

Many different additives may be added to achieve the desired qualities of the foam material. These additives are added in an amount to achieve the desired result. For examples, a pigment may added in an amount to obtain the desired whiteness or color of the foam material. Blowing agents are added to achieve the desired density of the foam.

Suitable elastomers can be used including polyoctenylene rubber having a high trans content. Such products are available under the trade name Vestanamer from Huls Corp. of West Germany. Particular grades of Vestanamer which are suitable are Vestanamer 8012 and Vestanamer 6213. Such elastomers can be used in a range of about 1 to about 20 phr.

Suitable homogenizing agents can be used, for example mixtures of aliphatic hydrocarbon resins such as 60 NS by Struktol. Such additives are added in amounts to provide the desired homogenizing effect and typically in the range of about 1 to about 3 phr.

Non-reinforcing fillers can be used such as, but not limited to, calcium carbonate and magnesium carbonate. Such additives are added in amount to obtain the desired effect, typically in a range of about 1 to about 30 phr. Suitable pigments can be used such as, but not limited to, Ultramarine Blue. Such pigments are added in amount to obtain the desired effect, typically in a range of 0 to about 5 phr.

Suitable activators can be used such as, but not limited to zinc oxide. Such activators are added in amount to obtain the desired effect and typically in a range of 1 to about 5 phr.

Suitable co-agents can be used such as peroxide, SR-350, triallyl cyanurate. Such co-agents are added in amount to obtain the desired effect and typically in a range of 0 to about 10 phr.

Stearic acid can be used to internal lubricant and activator to obtain the desired effect and typically in a range of 0 to about 3 phr.

Additives to improve processing characteristics of the foam material may be used such as polyethylene wax to provide the desired processing characteristics and typically in the range of 0 to about 15 phr.

Titanium dioxide can be used along with a pigment in an amount to obtain the desired effect and typically in the range of 0 to about 20 phr. Anatase or Rutile forms of the titanium dioxide can be used.

Suitable cure system and blowing agents can be used, typically in the range of 0.5 to about 18 phr. Some chemical blowing agents can vary the gas pressures and microcellular cell structure. Suitable chemical blowing agents include modified or activated azodicarbonamides, dinitrosopentamethylene tetramine, sulfonyl hydrazides.

Suitable polymerization initiators can be used such as peroxides. Polymerization initiators are typically used in the range of about 1 to about 6 phr. Suitable peroxides include dicumyl peroxide, dibenzoyl peroxide and 2,5 dimethyl-2,5-di-(tert-butylperoxy)hexyne-3.

The following provides a table of potential ingredients to prepare the foam material. In general, the desired polymers/copolymers are combined with suitable additives and cure system and blowing agents.

| Inventive Foam | PHR (Parts per hundred) Range |
|---|---|
| Polymers | |
| Alpha Olefin Copolymer | 5-40 |
| Hydrogenated acrylonitrile-butadiene, zinc oxide, zinc diacrylate blend | 15-30 |
| Hydrogenated acrylonitrile-butadiene | 10-90 |
| Additives | |
| Elastomer (Polyoctanamer) | 0-20 |
| Homogenizing agent | 1-3 |
| Non-reinforcing filler | 0-10 |
| Activator (Zinc oxide) | 0.5-3 |
| Coagent #1 | 1-5 |
| Stearic Acid | 0-2 |
| Processing Agent (Polyethylene Wax) | 0-15 |
| Titanium dioxide | 0-5 |
| Pigment (Ultramarine Blue) | 0-1 |
| Cure System and Blowing Agents | |
| Blowing Agent #1 | 1-18 |
| Blowing Agent #2 | 1-5 |
| Polymerization initiator (Dicumyl Peroxide) | 2-6 |
| Coagent #2 | 0.5-2 |

The foam can be formed in a suitable manner. For example, the materials can be mixed together using any suitable mixer such as a Branbury mixer.

Generally, the polymers are loaded first along with a homogenizing agent (if desired) at a temperature of about 30 to 60° C. The polymers are premasticated for a suitable time, typically about 1 minute and then, at a temperature of about 60 to about 80° C., the remaining ingredients are added except the cross-linker, peroxide, and blowing agent. The temperature is heated to about 80 to about 105° C. while mixing. The cross-linker is added followed by the peroxide and blowing agent. The temperature is raised to 100 to 130° C.

The mixture can be transferred to a pelletizing machine (to form pellets) or to a roll mill (to form sheet stock). For example, in a roll mill, the distance between rollers is 3-4 mm. The mix is homogenized on the roller for about 3-10 minutes at about 90 to 110° C. and then rolled to the desired thickness.

A pelletizing machine allows the material to be processed using traditional EVA or rubber injection machines. The mold temperature in the pelletizing machine is typically set to about 150 to about 170° C. The resulting product can be stabilized in a cooling tunnel or can be allowed to cool at room temperature.

A roll mill, typically a 2 roll mill, provides a sheet stock in accordance with conventional techniques. The sheet stock is further processed using traditional compression molding methods for footwear manufacturing.

The cure temperature of the foam is typically 150° C. to 170° C. Cure times and mold thickness are variable depending on the desired thickness of the foam material. The foam material can be used for the inner midsole core.

The properties of the foam provide the lightweight spongy feel. The density of the foam material is generally less than 0.25 g/cm$^3$, (for example 0.05 to 0.25 g/cm$^3$), less than 0.20 g/cm$^3$, less than 18 g/cm$^3$, less than 0.15 g/cm$^3$, less than 0.12 g/cm$^3$, and in one aspect, about 0.10 g/cm$^3$.

Resiliency of the foam is greater than 40%, greater than 45%, at least 50%, and in one aspect from 50-70%. Compression set is 60% or less, (for example 20 to 60%), 50% or less, 45% or less. The hardness (Durometer Asker C) of the foam is typically, 25 to 50, 25 to 45, 25 to 35, 35 to 45, depending on the type of footwear, for example. A running shoe typically has a hardness of 25 to 35 Asker C whereas basketball type shoes have an Asker C of about 35 to 45 Asker C.

The tensile strength is at least 15 kg/cm$^2$, typically 15 to 40. The elongation % is 150 to 500, typically above 250. The tear strength is 6-15 kg/cm, typically above 7.

The foam material has lower energy loss and is more lightweight than traditional EVA foams. Energy loss is generally less than 30% or about 20% to about 30%.

For example, traditional ethylene vinyl acetate (EVA) foams typically have a resilience of 30-40%, a compression set of 50-60%, and a density of 0.15-0.25 g/cm$^3$.

EXAMPLE 1

The following foam material was prepared using hydrogenated acrylonitrile-butadiene.

| Inventive Foam | PHR (Parts per hundred) |
|---|---|
| Polymers | |
| Engage 8480 (Copolymer of ethylene & Octene-1) | 25 |
| ZSC 2095 (Hydrogenated acrylonitrile-butadiene, zinc oxide, zinc diacrylate blend) | 15 |
| Zetpol 2000 (Hydrogenated acrylonitrile-butadiene,) | 60 |
| Additives | |
| Vestanamer 8012 (Polyoctanamer) | 10 |
| 60 NS (Homogenizing agent) | 1 |
| CaCo3 (Filler) | 2 |
| ZnO (Activator) | 0.5 |
| SR350 (Crosslinker) | 1 |
| ST-AC (Stearic Acid) | 1 |
| AC617 (Polyethylene Wax) | 7 |
| TiO$_2$ (Titanium dioxide) | 3 |
| Ultramarine Blue | 0.4 |
| Cure System and Blowing Agents | |
| Rhenoslab AZ130-75 (Blowing Agent) | 12 |
| Blowform SH (Blowing Agent) | 2 |
| Akroform DC-40 EPR (Peroxide) | 4 |
| TAC-50 (triallyl cyanurate) | 1 |
| Cure temperature | 315 F. |
| Cure time | 20 min |
| Mold thickness | 10 mm |
| Density (g/cm3) | 0.11 |
| Appearance | Good |
| Process temp | 180-220 F. |

| Physical Properties | A |
|---|---|
| Durometer Asker C | 34 |
| Tensile kg./cm$^2$ | 18, 17, 19 |
| Elongation % | 313, 322, 349 |
| Tear kg./cm | 8.1, 7.6, 7.6 |
| Split Tear kg./cm. | 1.5 |
| Shrinkage | 2.9 |
| S.G._by Dimension | 0.11 |
| Compression set % | 20 |
| Resiliency | 52 |

EXAMPLE 2

The following foam material was prepared using non-hydrogenated acrylonitrile-butadiene.

| Inventive Foam | PHR (Parts per hundred) |
|---|---|
| Polymers | |
| Engage 8440 (Copolymer of ethylene & Octene-1) | 35 |
| ZSC 2095 (Hydrogenated acrylonitrile-butadiene, zinc oxide, zinc diacrylate blend) | 15 |
| Nipol DN1201L (Acrylonitrile-butadiene) | 50 |
| Additives | |
| Vestanamer 8012 (Polyoctanamer) | 10 |
| 60 NS (Homogenizing agent) | 1 |
| CaCo3 (Filler) | 7 |
| ZnO (Activator) | 1 |
| SR350 (Crosslinker) | 2 |
| ST-AC (Stearic Acid) | 1 |
| TiO$_2$ (Titanium dioxide) | 7 |
| Ultramarine Blue | 1 |
| Cure System and Blowing Agents | |
| Rhenoslab AZ130-75 (Blowing Agent) | 13 |
| Akroform DC-40 EPR (Peroxide) | 4 |
| Cure temperature | 315 F. |
| Cure time | 10-12 min |
| Mold thickness | 6 mm |
| Density (g/cm3) | 0.1 |

| Physical Properties | A |
|---|---|
| Durometer Asker C | 24 |
| Tensile kg./cm$^2$ | 9.4, 8.7, 8.8, 10.7 |
| Elongation % | 150, 143, 148, 182 |
| Tear kg./cm | 4.4, 4.5, 4.8, 4.7 |
| Split Tear kg./cm. | 0.51 |
| Shrinkage | 5.4, 4.8 |
| S.G._by Dimension | 0.09, 0.09 |
| Compression set % | 67, 71 |

EXAMPLE 3

A study was conducted to compare the steady state energy expenditure when wearing Nike Air Pegasus and Nike Lunar shoes made in accordance with the invention. The weight of the Lunar shoes was less than half the weight of the Pegasus shoes as shown in the following table

| Shoe | Weight Per shoe |
|---|---|
| Lunar: Men | 135 g |
| Pegasus: Men | 322 g |
| Lunar: Women | 126 g |
| Pegasus: Women | 312 g |

Twenty-two (10 male and 12 female) well-conditioned runners were provided with both Nike Air Pegasus and Nike Lunar shoes. Male subjects: Age 26.9±7.2 years, weight 65.8±6.4 kg. Female subjects: Age 29.0+10.2 years, weight 57.3±4.8 kg. The subjects were dressed in their normal running shirts and shorts. All subjects wore the same Nike shortcut Dri-Fit socks (14 g each).

The environmental chamber was set at 20° C.; 50% RH. Airflow at a constant 2.5 m/sec was directed toward the front of the subject; other body surfaces were exposed to turbulent airflow at rates $\leq 1.4$ m/sec. Shoes were assigned in counterbalanced order and each subject completed four consecutive 10-minute bouts of exercise, alternating shoes during the 3-minute break between runs, thus wearing each shoe twice during the test session. Level treadmill running speeds averaging 8.1 and 8.6 mph for the females and males, respectively, were set to require approximately 80% of each subject's aerobic capacity.

Heart rate was monitored continuously (Polar, Inc.) and recorded every minute. Oxygen consumption was monitored continuously (ParvoMedics, Inc,) and the mean of the last four minutes (e.g., minutes 7 thru 10) was selected as the most valid estimate of the steady-state energy expenditure during each experiment. Hence, the data reported for each subject represent the mean for duplicate experiments for each shoe during the same testing session. Pre- and post nude weights were measured on a scale accurate to ±10 g (Ohaus Corp).

Heart rates (bpm) were calculated as percent of predicted heart rate max. Steady-state values for oxygen consumption were calculated as ml/kg•min$^{-1}$.

Twenty of the 22 subjects exhibited a lower oxygen requirement when wearing the lighter Lunar shoe. These reductions in energy expenditure when running at the same pace on a level treadmill were significant (P<0.01) and averaged −3.0±1.0% and −3.5±1.9% for the male and female subjects respectively.

Steady state heart rates for the males averaged 79% and 80% of their age-predicted maximal values when wearing the Lunar and Pegasus shoes, respectively. Corresponding values for the female subjects were 85% and 86% of their age-predicted maximal heart rates.

When queried, the subjects preferred the Lunar shoe for running under these conditions.

EXAMPLE 4

Comparative values were obtained for Peak G, Energy Absorption, and CD Curves for the following types of cores and core/shell combinations:
  A. CMP LUNAR FOAM CORE Made in WHQ (M4533 A)
  B. CMP EVA PHYLON FOAM CORE Made in WHQ (M4533 B)
  C. INJECTED LUNAR FOAM CORE Made in Asia (FT) (M4533 C)
  D. CMP LUNAR CORE (WHQ), ASSEMBLED WITH PHYLON SHELL (M4532 A)
  E. INJECTED LUNAR CORE (ASIA FT), ASSEMBLED WITH PHYLITE SHELL (M4532 B)

Sample 1 foam formula were used in A and C above. The injected and CMP cores have the same formula except they were processed by different methods.

| ID | Sample | Thickness (mm) | Peak G | Energy Loss (%) |
|---|---|---|---|---|
| A | M4533 - A1 Heel | 17.9 | 14.4 | 26 |
| B | M4533 - B1 Heel | 17.9 | 11.1 | 36 |
| C | M4533 - C1 Heel | 23.1 | 10.1 | 29 |
| D | M4532 - D1 Heel | 29.3 | 8.2 | 37 |
| E | M4532 - E1 Heel | 29.4 | 9.0 | 36 |
| A | M4533 - A1 FF | 11.2 | 38.6 | 27 |
| B | M4533 - B1 FF | 10.5 | 29.8 | 32 |
| C | M4533 - C1 FF | 13.0 | 29.5 | 28 |
| D | M4532 - D1 FF | 20.5 | 13.8 | 31 |
| E | M4532 - E1 FF | 21.1 | 12.8 | 37 |

Results for heel and forefoot impact results are shown in FIGS. 5a, 5b, 5 c, 5d, 5e, and 5f. FIG. 5a depicts heel impact G results. FIG. 5b depicts heel impact energy loss results. FIG. 5c depicts forefoot impact G results. FIG. 5d depicts Forefoot impact energy loss results.

Results for M4533 Samples A, B and C

For a heel impact, the results of FIG. 5a indicate that Sample C had the lowest Peak G with a value of 10.1 G, followed by sample B with a Peak G of 11.1 G and Sample A with the highest Peak G and a value of 14.4. For Energy Loss values shown in FIG. 5b, Sample A had the lowest with a value of 26%, Sample C had the next lowest with value of 29% and Sample B had the highest with 36%.

For a forefoot impact, the results shown in FIG. 5c indicate that Samples B and C had the lowest Peak G ranging from 29.5 to 29.8 G. Sample A had the highest value of 38.6 G. For Energy Loss values shown in FIG. 5d, the samples ranged from 28 to 32%, which was not considered to be meaningful differences.

Load vs Deflection curves are depicted in FIG. 5e and FIG. 5f for heel impact Peak G results and forefoot impact G results, respectfully. The sharp spikes in the curves for sample A, B, and C indicate that the samples were starting to bottom out.

Results for M4532 Samples D and F

For heel impact, the results in FIG. 5a indicate that Sample D had the lower Peak G with a value of 8.2 G compared to Sample E with a value of 9.0 G. The Energy loss values in FIG. 5b range from 36 to 37% which was not considered a meaningful difference.

For a forefoot impact, the results in FIG. 5c indicate Sample E has the lower Peak G with a value of 12.8 G compared to Sample D with a value of 13.8 G. The Energy loss values in FIG. 5d range from 31 to 37% which is not considered to be a meaningful difference.

Generally speaking, a lower Peak G value indicates softer cushioning, a higher value indicates firmer cushioning. A difference in Peak G values greater than 0.5 G is considered to be a meaningful difference (outside the variance of the machine.) A difference in Peak G values greater than 1.0 G for a heel impact indicates that to a discerning consumer, a "Just Noticeable Difference" (JND) may exist between the two shoes. Energy Loss is a measure of responsiveness, the lower the Energy Loss the more responsive the cushioning. A difference in Energy Loss greater than 10% is considered to be a meaningful difference.

In light of the foregoing disclosure of the invention and description of various embodiments, those skilled in this area of technology will readily understand that various modifications and adaptations can be made without departing from the scope and spirit of the invention. All such modifications and adaptations are intended to be covered by the following claims.

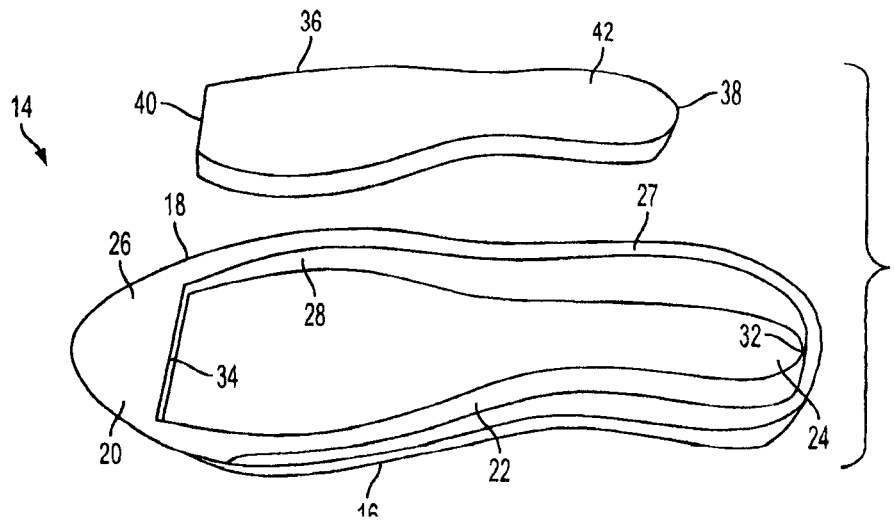

What is claimed is:

1. An article of footwear comprising, in combination:
an upper;
a sole assembly secured to the upper and comprising:
   a first portion having a lower ground engaging surface, an upper surface, and a recess formed in the upper surface, the upper surface of the first portion in contact with the upper; and
   a second portion seated in the recess in the first portion and having an upper surface, the upper surface of the second portion in contact with the upper,
   wherein the second portion is formed from a first foam material comprising a reaction product of about 10 to about 100 phr hydrogenated or non-hydrogenated acrylonitrile butadiene copolymer, 0 to about 40 phr modified hydrogenated acrylonitrile butadiene copolymer, and 0 to about 90 phr alpha olefin copolymer, and at least one additive in an amount suitable to form the foam material;
   wherein the hardness of the first foam material is 25 to 45 Asker C and the density of the first foam material is less than about 0.15 g/cm$^3$.

2. The article of footwear of claim 1, wherein the first foam material comprises about 30 to about 90 phr hydrogenated or non-hydrogenated acrylonitrile butadiene copolymer, about 5 to about 30 phr modified hydrogenated acrylonitrile butadiene copolymer, and about 20 to about 40 phr alpha olefin copolymer.

3. The article of footwear of claim 1, wherein the modified hydrogenated acrylonitrile butadiene copolymer is modified with zinc oxide, zinc diacrylate, or both.

4. The article of footwear of claim 1, wherein the alpha olefin copolymer is a copolymer of ethylene and an alpha olefin having 3 to 20 carbon atoms.

5. The article of footwear of claim 4, wherein the alpha olefin copolymer is selected from copolymers of ethylene and 1-octane.

6. The article of footwear of claim 1, wherein the first foam material has a hardness of 25 to 35 Asker C.

7. The article of footwear of claim 1, wherein the first foam material has a hardness of 35 to 45 Asker C.

8. The article of footwear of claim 1, wherein the first portion has a density greater than a density of the second portion.

9. The article of footwear of claim 1, wherein the first portion comprises ethylene vinyl acetate or a blend of ethylene vinyl acetate and rubber.

10. The article of footwear of claim 1, wherein the first portion comprises a second foam material comprising a reaction product of about 10 to about 100 phr hydrogenated or non-hydrogenated acrylonitrile butadiene copolymer, 0 to about 40 phr modified hydrogenated acrylonitrile butadiene copolymer, and 0 to about 90 phr alpha olefin copolymer, and at least one additive in an amount suitable to form the foam material;
wherein the density of the second foam material is greater than the density of the first foam material.

11. The article of footwear of claim 1 wherein the density of the second foam material is greater than 0.10 g/cm$^3$.

12. The article of footwear of claim 1, wherein the upper surface of the first portion is secured to the upper.

13. The article of footwear of claim 1, wherein the upper surface of the second portion is secured to the upper.

14. The article of footwear of claim 1, wherein the recess extends across all but a peripheral portion of the first portion.

15. The article of footwear of claim 1, wherein the first portion comprises a heel portion, a midfoot portion and a forefoot portion, the recess extending from a rear of the heel portion to a front of the forefoot portion.

16. The article of footwear of claim 1, wherein the lower ground engaging surface includes a plurality of projections.

17. The article of footwear of claim 1, further comprising a plurality of grooves formed in the lower ground engaging surface, each groove extending about a periphery of a corresponding projection.

18. The article of footwear of claim 1, further comprising a plurality of ribs extending substantially horizontally along a sidewall of the sole assembly.

19. The article of footwear of claim 1 wherein the ribs extend outwardly from the first portion.

20. An article of footwear comprising, in combination:
an upper;
a sole assembly secured to the upper and comprising:
   a first portion having a lower ground engaging surface, an upper surface, a recess formed in the upper surface, the upper surface of the first portion being secured to the upper, and being formed of a material having a first density; and
   a second portion seated in the recess in the first portion, having an upper surface secured to the upper, and being formed of a material having a second density, the second density being less than the first density,
   wherein the second portion is a foam material comprising a reaction product of about 10 to about 100 phr hydrogenated or non-hydrogenated acrylonitrile butadiene copolymer, 0 to about 40 phr modified hydrogenated acrylonitrile butadiene copolymer, and 0 to about 90 phr alpha olefin copolymer, and at least one additive in an amount suitable to form the foam material;
   wherein the hardness of the first foam material is 25 to 45 Asker C and the density of the foam material is less than about 0.15 g/cm$^3$.

21. The article of footwear of claim 20, wherein the first foam material has a hardness of 25 to 35 Asker C.

22. The article of footwear of claim 20, wherein the first foam material has a hardness of 35 to 45 Asker C.

23. A sole assembly comprising:
a first portion having a lower ground engaging surface, an upper surface, and a recess formed in the upper surface; and
a second portion seated in the recess in the first portion and having an upper surface,
   wherein the second portion is formed from a first foam material comprising a reaction product of about 10 to about 100 phr hydrogenated or non-hydrogenated acrylonitrile butadiene copolymer, 0 to about 40 phr modified hydrogenated acrylonitrile butadiene copolymer, and 0 to about 90 phr alpha olefin copolymer, and at least one additive in an amount suitable to form the foam material;
   wherein the hardness of the first foam material is 25 to 45 Asker C and the density of the first foam material is less than about 0.15 g/cm$^3$.

24. The article of footwear of claim 23, wherein the first foam material has a compression set less than 50% and a resiliency greater than 40%.

25. The sole assembly of claim 23, wherein the first portion has a density greater than a density of the second portion.

26. The sole assembly of claim 23, wherein the first portion is formed from a first foam material comprising a reaction product of about 10 to about 100 phr hydrogenated or non-hydrogenated acrylonitrile butadiene copolymer, 0 to about 40 phr modified hydrogenated acrylonitrile butadiene copolymer, and 0 to about 90 phr alpha olefin copolymer, and
at least one additive in an amount suitable to form the foam material;
wherein the density of the second foam material is greater than the first foam material.

27. The sole assembly of claim 23, wherein the recess extends across all but a peripheral portion of the first portion.

28. The sole assembly of claim 23, wherein the first portion comprises a heel portion, a midfoot portion and a forefoot portion, the recess extending from a rear of the heel portion to a front of the forefoot portion.

29. The sole assembly of claim 23, wherein the lower ground engaging surface includes a plurality of projections.

30. The sole assembly of claim 23, further comprising a plurality of grooves formed in the lower ground engaging surface, each groove extending about a periphery of a corresponding projection.

31. The sole assembly of claim 23, further comprising a plurality of ribs extending substantially horizontally along a sidewall of the sole assembly.

32. The sole assembly of claim 23, wherein the ribs extend outwardly from the first portion.

33. The sole assembly of claim 23, wherein the first foam material has a hardness of 25 to 35 Asker C.

34. The sole assembly of claim 23, wherein the first foam material has a hardness of 35 to 45 Asker C.

* * * * *

UNITED STATES PATENT AND TRADEMARK OFFICE
CERTIFICATE OF CORRECTION

| | | |
|---|---|---|
| PATENT NO. | : 7,941,938 B2 | |
| APPLICATION NO. | : 11/752348 | |
| DATED | : May 17, 2011 | |
| INVENTOR(S) | : Sui-Chieh Yu et al. | |

It is certified that error appears in the above-identified patent and that said Letters Patent is hereby corrected as shown below:

Delete the title page and substitute therefore the attached title page consisting of the corrected illustrative figure.

Please delete the informal drawings Fig. 1–Fig. 6f (Drawing Sheets 1-4) and insert the attached Formal Drawings Fig. 1–Fig. 6f (Drawing Sheets 1-4).

Signed and Sealed this
Eleventh Day of October, 2011

David J. Kappos
*Director of the United States Patent and Trademark Office*

(12) United States Patent
Yu et al.

(10) Patent No.: US 7,941,938 B2
(45) Date of Patent: May 17, 2011

(54) ARTICLE OF FOOTWEAR WITH LIGHTWEIGHT SOLE ASSEMBLY

(75) Inventors: Sui-Chieh Yu, Portland, OR (US); Denis Schiller, Vancouver, WA (US); Daniel DeSpain, Castle Rock, WA (US); David Patrick Jones, Beaverton, OR (US); Eric P. Avar, Aloha, OR (US); Kevin W. Hoffer, Portland, OR (US)

(73) Assignee: Nike, Inc., Beaverton, OR (US)

( * ) Notice: Subject to any disclaimer, the term of this patent is extended or adjusted under 35 U.S.C. 154(b) by 1004 days.

(21) Appl. No.: 11/752,348

(22) Filed: May 23, 2007
(Under 37 CFR 1.47)

(65) Prior Publication Data
US 2008/0244926 A1  Oct. 9, 2008

Related U.S. Application Data

(60) Provisional application No. 60/808,551, filed on May 26, 2006.

(51) Int. Cl.
*A43B 13/00* (2006.01)
(52) U.S. Cl. .......................................... 36/25 R; 36/28
(58) Field of Classification Search .............. 36/28, 31, 36/30 R, 30 A, 25 R
See application file for complete search history.

(56) References Cited

U.S. PATENT DOCUMENTS

| | | |
|---|---|---|
| 2,410,019 A | 10/1946 | Davis |
| 4,302,892 A | 12/1981 | Adamik |
| 4,364,188 A | 12/1982 | Turner et al. |
| 4,364,189 A | 12/1982 | Bates |
| 4,398,357 A | 8/1983 | Batra |
| 4,399,620 A * | 8/1983 | Funck ............... 36/30 R |
| 4,547,979 A | 10/1985 | Harada et al. |
| 4,551,930 A | 11/1985 | Graham et al. |
| 4,557,060 A | 12/1985 | Kawashima |
| 4,642,911 A | 2/1987 | Talarico, II |
| 4,654,983 A | 4/1987 | Graham et al. |
| 4,667,423 A | 5/1987 | Autry et al. |
| 4,730,402 A | 3/1988 | Norton et al. |
| 4,759,136 A | 7/1988 | Stewart et al. |
| 4,766,679 A | 8/1988 | Bender |
| 4,876,053 A | 10/1989 | Norton et al. |

(Continued)

FOREIGN PATENT DOCUMENTS

GB  2007081  5/1979
(Continued)

OTHER PUBLICATIONS

PCT/US2007/012295, Annex to Partial International Search, dated Nov. 5, 2007.

*Primary Examiner* — Marie Patterson
(74) *Attorney, Agent, or Firm* — Banner & Witcoff, Ltd.

(57) ABSTRACT

An article of footwear includes an upper and a sole assembly secured to the upper. The sole assembly includes a first portion having a lower ground engaging surface, an upper surface, and a recess formed in the upper surface. The upper surface of the first portion is in contact with the upper. A second portion is seated in the recess in the first portion and has an upper surface, with the upper surface of the second portion being in contact with the upper. The second portion comprises a foam material having a density less than 0.25 g/cm³.

34 Claims, 4 Drawing Sheets